United States Patent
Shyu et al.

(10) Patent No.: US 12,092,827 B2
(45) Date of Patent: Sep. 17, 2024

(54) LENS OF HEAD-MOUNTED DISPLAY

(71) Applicant: Young Optics Inc., Hsinchu (TW)

(72) Inventors: Jyh-Horng Shyu, Hsinchu (TW);
Kuo-Chuan Wang, Hsinchu (TW);
Zi-Yang Huang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 18/154,018

(22) Filed: Jan. 12, 2023

(65) Prior Publication Data
US 2024/0241378 A1    Jul. 18, 2024

(51) Int. Cl.
*G02B 5/30* (2006.01)
*G02B 3/00* (2006.01)
*G02B 3/04* (2006.01)
*G02B 27/01* (2006.01)

(52) U.S. Cl.
CPC ....... *G02B 27/0172* (2013.01); *G02B 3/0062* (2013.01); *G02B 3/0087* (2013.01); *G02B 3/04* (2013.01); *G02B 5/3083* (2013.01)

(58) Field of Classification Search
CPC .............. G02B 27/0172; G02B 3/0062; G02B 3/0087; G02B 3/04; G02B 5/3083
See application file for complete search history.

(56) References Cited

U.S. PATENT DOCUMENTS

| | | | |
|---|---|---|---|
| 11,156,814 B2* | 10/2021 | Steiner | G02B 27/0172 |
| 2019/0377184 A1 | 12/2019 | Sharp et al. | |
| 2020/0379226 A1* | 12/2020 | Steiner | G02B 5/3083 |
| 2023/0091357 A1* | 3/2023 | Fein | G02B 25/001 |
| | | | 359/643 |

OTHER PUBLICATIONS

Dewen Cheng et al., "Optical design and pupil swim analysis of a compact, large EPD and immersive VR head mounted display", Optics Express, vol. 30, No. 5, Feb. 28, 2022, pp. 6584-6602.

* cited by examiner

*Primary Examiner* — Afroza Chowdhury
(74) *Attorney, Agent, or Firm* — JCIPRNET

(57) ABSTRACT

A lens of a head-mounted display including a see-through mirror/coating, a gradient-index lens element, and a polarizer which are disposed in sequence is provided. The lens also includes a first aspheric lens element disposed between the see-through mirror/coating and the polarizer. The gradient-index lens element has a planar surface, and the quarter-wave plate is disposed on the planar surface of the gradient-index lens element.

20 Claims, 6 Drawing Sheets

LENS OF HEAD-MOUNTED DISPLAY

BACKGROUND

Technical Field

The disclosure relates to an optical lens, and particularly relates to a lens of a head-mounted display (HMD).

Description of Related Art

With the advancement of display technology as well as consumers' expectation for innovative products, head-mounted displays have been developed and gradually commercialized. Head-mounted displays are a kind of near-eye display that is placed in front of the eyes at a short distance and allows the eyes to see a virtual image at the front.

In order for the virtual image formed in front of the eyes by the head-mounted display to cover a greater field of view, the lens elements adopted in the head-mounted display may be thick and heavy. In order to make the head-mounted display lighter, thinner, shorter, and smaller, a lens with a pancake structure is adopted in the conventional art. However, in the conventional lens with a pancake structure, a quarter-wave plate is disposed on a curved lens element. When a planar film (i.e., the quarter-wave plate) is attached onto the curved surface of the lens element, the yield may be affected.

SUMMARY

An aspect of the disclosure provides a lens of a head-mounted display with a high yield.

An embodiment of the disclosure provides a lens of a head-mounted display, including a see-through mirror/coating, a gradient-index lens element, and a polarizer disposed in sequence. The lens also includes a first aspheric lens element disposed between the see-through mirror/coating and the polarizer. The gradient-index lens element has a planar surface, and the quarter-wave plate is disposed on the planar surface of the gradient-index lens element.

An embodiment of the disclosure provides a lens of a head-mounted display, including a see-through mirror/coating, a quarter-wave plate, and a polarizer disposed in sequence. The lens further includes a gradient-index lens element disposed between the see-through mirror/coating and the polarizer. The gradient-index lens element includes a planar surface, and the quarter-wave plate is disposed on the planar surface of the gradient-index lens element.

An embodiment of the disclosure provides a lens of a head-mounted display, including a see-through mirror/coating, a quarter-wave plate, and a polarizer in sequence. The lens further includes an aspheric gradient-index lens element disposed between the see-through mirror/coating and the polarizer. The aspheric gradient-index lens element includes a planar surface, and the quarter-wave plate is disposed on the planar surface of the aspheric lens element.

In the lens of the head-mounted display according to the embodiments of the disclosure, a gradient-index lens element or an aspheric gradient-index element having a planar surface is adopted, and the quarter-wave plate is disposed on the planar surface of the gradient-index lens element or the aspheric gradient-index lens element. Since the quarter-wave plate is disposed on the planar surface, instead of being disposed on a curved surface, the yield for attaching the quarter-wave plate is facilitated. Consequently, the yield as well as the optical imaging quality of the lens of the head-mounted display according to the embodiments of the disclosure can be facilitated effectively.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
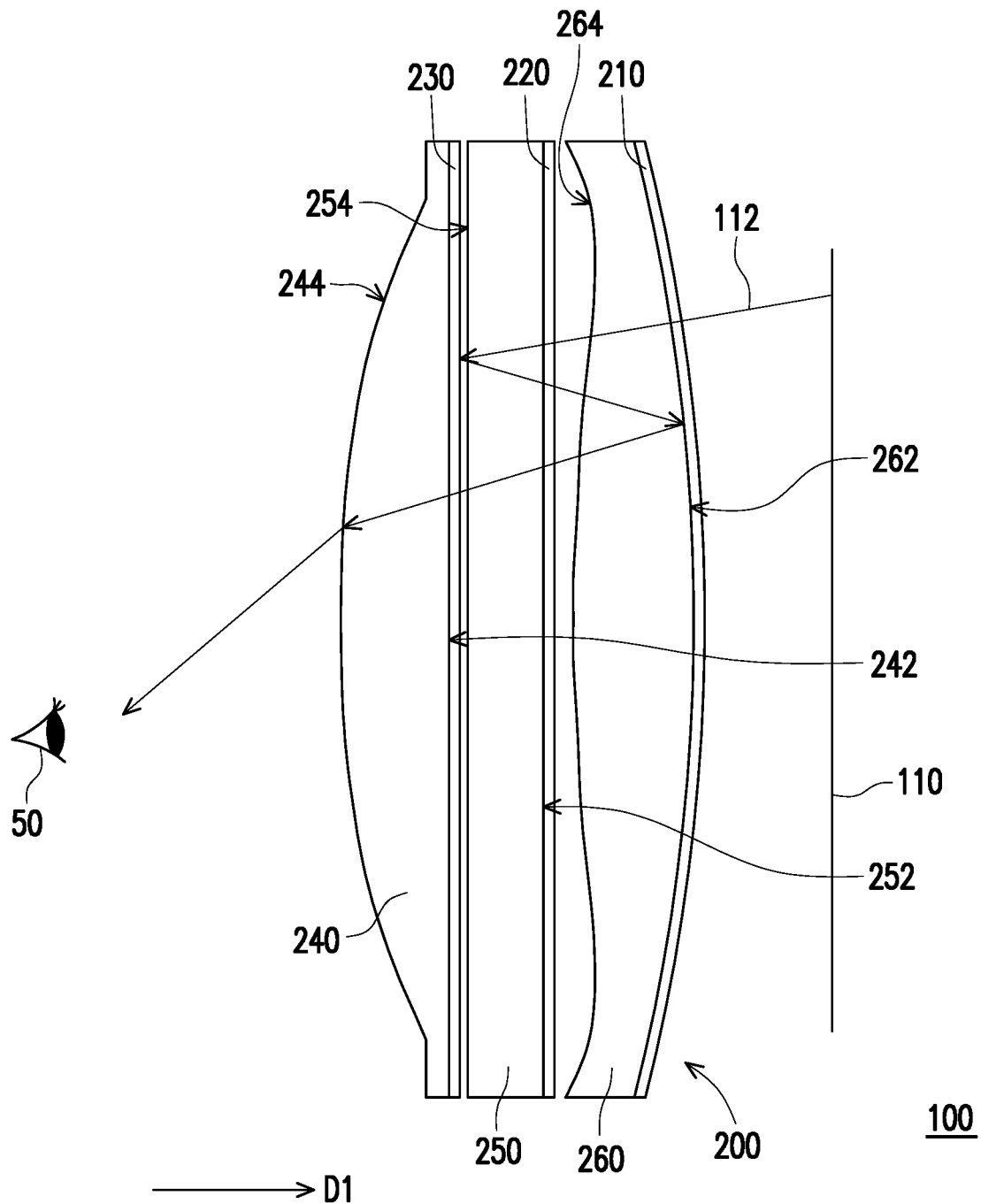
FIG. 1 is a schematic cross-sectional view illustrating a head-mounted display according to an embodiment of the disclosure.

FIG. 1 is a schematic cross-sectional view illustrating a head-mounted display according to an embodiment of the disclosure. Referring to FIG. 1, a head-mounted display 100 of the embodiment includes a display panel 110 and a lens 200. The display panel 110 is configured to emit an image beam 112, and the lens 200 is disposed on a light path downstream side of the display panel 110. The display panel 110 is, for example, a liquid crystal display panel. A quarter-wave plate may be disposed on the light emitting surface of the display panel 110, and the image beam 112 emitted by the display panel 110 may be circularly polarized light. The image beam 112 may have a circular polarization direction, for example. In another embodiment, the display panel 110 may also be an organic light emitting diode (OLED) display panel or other suitable display panels. A circular polarizer or a quarter-wave plate may be disposed on the light emitting surface or the light exiting surface of the display panel 110. Accordingly, the image beam 112 passing through the circular polarizer or the quarter-wave plate is circularly polarized light and has the circular polarization direction.

The lens 200 of the head-mounted display 100 includes a see-through mirror/coating (a.k.a. see-through mirror or see-through mirror coating) 210, a gradient-index lens element 250, and a polarizer 230 disposed in sequence. The lens 200 also includes a first aspheric lens element 260 disposed between the see-through mirror/coating 210 and the polarizer 230. The gradient-index lens element 250 has a planar surface (e.g., a surface 252), and the quarter-wave plate 220 is disposed on the planar surface (e.g., the surface 252) of the gradient-index lens element 250.

In the embodiment, the lens 200 substantially includes three lens elements. For example, the lens 200 sequentially includes a second aspheric lens element 240, the gradient-index lens element 250, and the first aspheric lens element 260 along a direction D1. In an embodiment, materials of the lens elements (e.g., the second aspheric lens element 240, the gradient-index lens element 250, and the first aspheric lens element 260) in the lens 200 are all plastic materials. In other embodiments, the materials of some or all of the lens elements of the lens 200 may also be glass. In addition, in other embodiments, the lens 200 may also substantially include one lens element, two lens elements, or four or more lens elements.

In the embodiment, the see-through mirror/coating 210 is disposed on a lens element surface furthest away from the second aspheric lens element 240, such as being disposed on a surface 262 of the first aspheric lens element 260 away from the gradient-index lens element 250, the polarizer 230 is disposed on a surface 242 of the second aspheric lens element 240 close to the gradient-index lens element 250, and the quarter-wave plate 220 is disposed on a surface 252 of the gradient-index lens element 250 close to the first aspheric lens element 260.

In the embodiment, the surface 242 of the second aspheric lens element 240 closest to the gradient-index lens element 250 is a planar surface. A surface 244 of the second aspheric lens element 240 away from the gradient-index lens element 250 is a convex surface, for example. A surface 254 of the gradient-index lens element 250 close to the second aspheric lens element 240 is a planar surface, for example. The planar surface of the gradient-index lens element 250 is, for example, the surface 252 of the gradient-index lens element 250 close to the first aspheric lens element 260. However, in other embodiments, the planar surface of the gradient-index lens element 250 may also be the surface 254 of the gradient-index lens element 250 close to the second aspheric lens element 240. In the embodiment, a surface 264 of the first aspheric lens element 260 close to the gradient-index lens element 250 is an aspheric surface, and the surface 262 of the first aspheric lens element 260 away from the gradient-index lens element 250 is a convex surface. In the embodiment, the refractive power of the second aspheric lens element 240 and the refractive power of the first aspheric lens element 260 are both positive, for example.

In the embodiment, a portion of the image beam 112 with the circular polarization direction which is emitted from the display panel 110 passes through the see-through mirror/coating 210, then passes through the first aspheric lens element 260, and arrives at the quarter-wave plate 220. The see-through mirror/coating 210 is adapted to allow a portion (e.g., 50%) of the image beam 112 to pass through and reflect a portion (e.g., 50%) of the image beam 112. After passing through the quarter-wave plate 220, the image beam 112 with the circular polarization direction is turned into linearly polarized light having a first linear polarization direction. The image beam 112 with the first linear polarization direction then passes through the gradient-index lens element 250 and is transmitted to the polarizer 230. The polarizer 230 is, for example, a reflective polarizing film or a reflective polarizing sheet, and is adapted to reflect the light with the first linear polarization light and allow light with a second linear polarization direction to pass through. The first linear polarization direction is perpendicular to the second linear polarization direction. Therefore, the polarizer 230 reflects the image beam 112 with the first linear polarization direction back to the gradient-index lens element 250. Then, the image beam 112 with the first linear polarization direction sequentially passes through the gradient-index lens element 250 and the quarter-wave plate 220, and is turned into circularly polarized light with a circular polarization direction after passing through the quarter-wave plate 220. Then, after passing through the first aspheric lens element 260, a portion of the image beam 112 with the circular polarization direction is reflected by the see-through mirror/coating 210 back to the first aspheric lens element 260 and passes through the first aspheric lens element 260 again. Then, after passing through the quarter-wave plate 220, the image beam 112 with the circular polarization direction is turned into linearly polarized light having a second linear polarization direction. Afterwards, the image beam 112 with the second linear polarization direction passes through the gradient-index lens element 250 and is then transmitted to the polarizer 230. Afterwards, the image beam 112 with the second linear polarization direction sequentially passes through the polarizer 230 and the second aspheric lens element 240 to be transmitted to an eye 50 of the user. Accordingly, the user is able to see a virtual image in front of the eye 50, and an effect of virtual reality is exhibited.

Figure 2A:
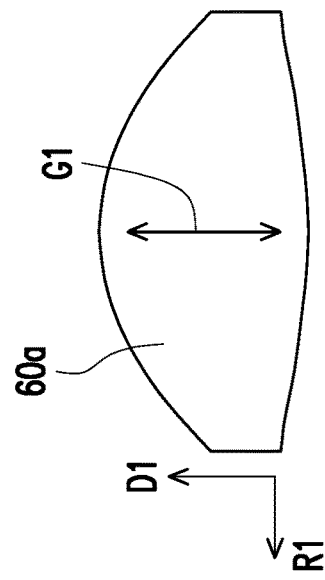
FIGS. 2A to 2C are views illustrating three gradient-index lens elements.
Figure 2B:
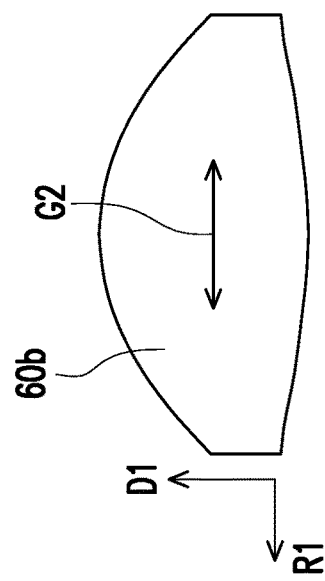
Figure 2C:
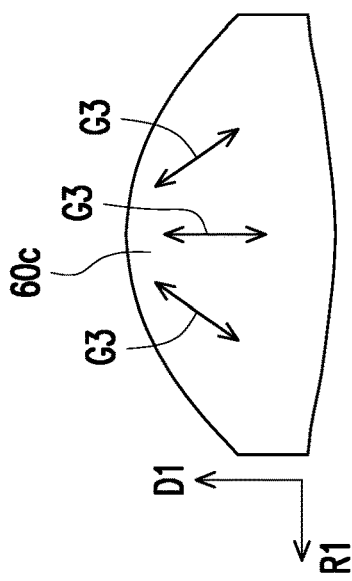

FIGS. 2A to 2C are views illustrating three gradient-index lens elements. Referring to FIG. 2A, a refractive index changing direction G1 of a gradient-index lens element 60a may be parallel to an optical axis of a gradient-index lens element 60, i.e., parallel to the direction D1. Referring to FIG. 2B, a refractive index changing direction G2 of a gradient-index lens element 60b may be parallel to a radial direction R1 of the gradient-index lens element 60b. Alternatively, referring to FIG. 2C, the refractive index of a gradient-index lens element 60c may change in the direction D1 as well as the radial direction R1, as indicated by refractive index changing directions G3. The three types of refractive index changes shown in FIGS. 2A to 2C are applicable to the gradient-index lens element 250 shown in FIG. 1.

In the lens 200 of the head-mounted display 100 of the embodiment, the gradient-index lens element 250 having a planar surface (e.g., the surface 252) is adopted, and the quarter-wave plate 220 is disposed on the planar surface of the gradient-index lens element 250. Since the quarter-wave plate 220 is disposed on a planar surface, instead of being disposed on a curved surface, the yield for attaching the quarter-wave plate 220 is facilitated. Consequently, the yield as well as the optical imaging quality of the lens 200 of the head-mounted display 100 according to the embodiment can be facilitated effectively. Accordingly, the structure of the lens 200 is stabilized, errors resulting from manufacturing processes are reduced, and, as a result, the resolution is increased. Meanwhile, since a gradient-index lens element is adopted in the lens 200, the design of the lens 200 becomes flexible and, as a result, the image resolution of the lens element 200 is increased, and the image distortion of the lens element 200 is reduced. Thus, the image quality of the lens 200 is facilitated.

Figure 3:
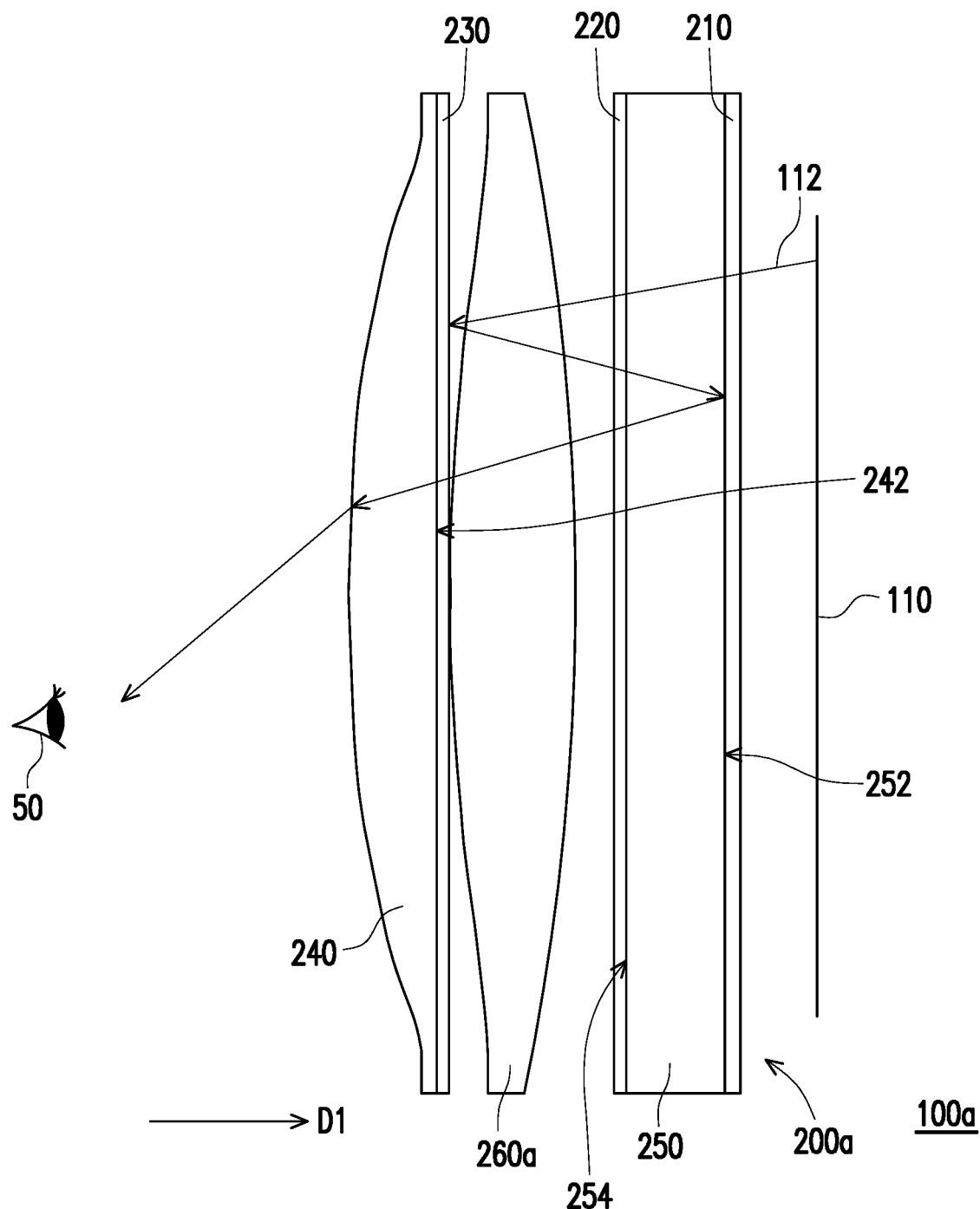
FIG. 3 is a schematic cross-sectional view illustrating a head-mounted display according to another embodiment of the disclosure.

FIG. 3 is a schematic cross-sectional view illustrating a head-mounted display according to another embodiment of the disclosure. Referring to FIG. 3, a head-mounted display 100a of the embodiment is similar to the head-mounted display 100 of FIG. 1, and the difference therebetween is as set forth in the following. A lens 200a of the head-mounted display 100a of the embodiment sequentially includes the second aspheric lens element 240, a first aspheric lens element 260a, and the gradient-index lens element 250 along the direction D1. In the embodiment, the half transmission and half coating film 210 is disposed on the surface 252 of the gradient-index lens element 250 away from the first aspheric lens element 260a, and the polarizer 230 is disposed on the surface 242 of the second aspheric lens element 240 close to the first aspheric lens element 260a. In addition, the quarter-wave plate 220 is disposed on the surface 254 of the gradient-index lens element 250 close to the first aspheric lens element 260a. In the embodiment, the first aspheric lens element 260a is a biconvex lens element, for example, and has positive refractive power.

Figure 4:
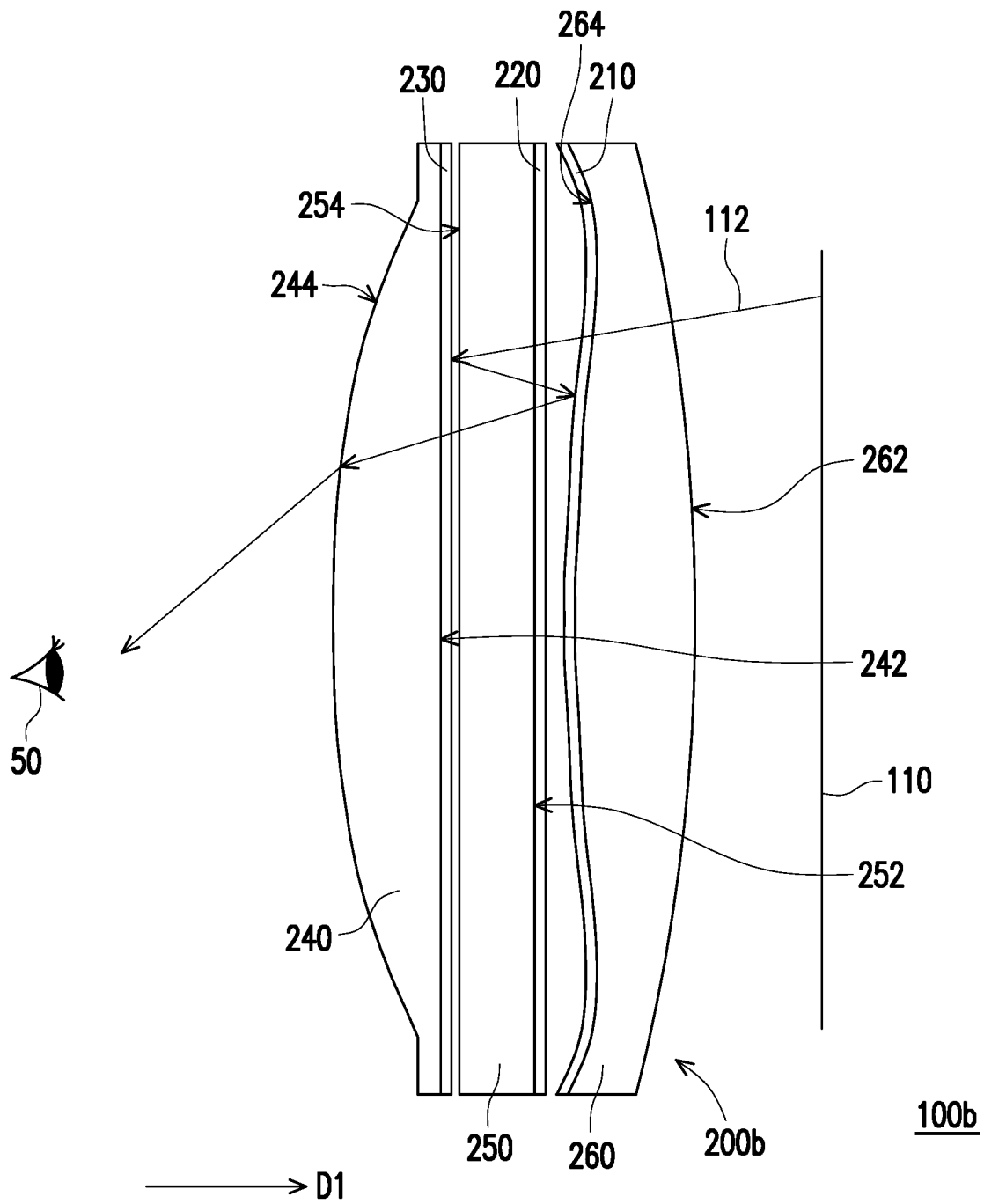
FIG. 4 is a schematic cross-sectional view illustrating a head-mounted display according to still another embodiment of the disclosure.

FIG. 4 is a schematic cross-sectional view illustrating a head-mounted display according to still another embodiment of the disclosure. Referring to FIG. 4, a head-mounted display 100b of the embodiment is similar to the head-mounted display 100 of FIG. 1, and the difference therebetween is as set forth in the following. In a lens 200b of the head-mounted display 100b, the gradient-index lens element 250 is disposed between the see-through mirror/coating 210 and the polarizer 230, and the see-through mirror/coating 210 is disposed on the surface 264 of the first aspheric lens element 260 close to the gradient-index lens element 250.

Figure 5:
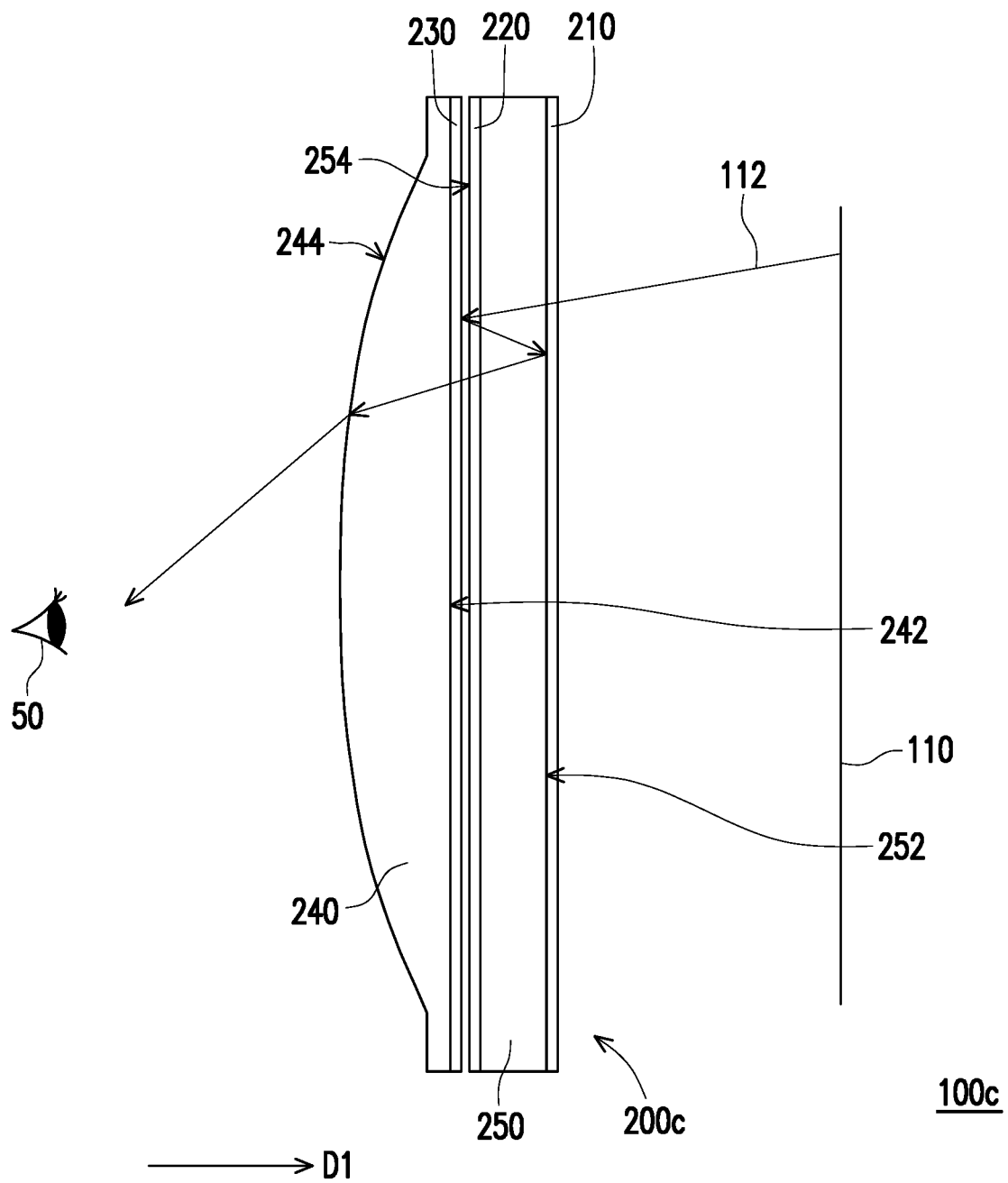
FIG. 5 is a schematic cross-sectional view illustrating a head-mounted display according to yet another embodiment of the disclosure.

FIG. 5 is a schematic cross-sectional view illustrating a head-mounted display according to yet another embodiment of the disclosure. Referring to FIG. 5, a head-mounted display 100c of the embodiment is similar to the head-mounted display 100 of FIG. 1, and the difference therebetween is as set forth in the following. A lens 200c of the head-mounted display 100c of the embodiment does not include the first aspheric lens element 260 as shown in FIG. 1, but includes the second aspheric lens element 240 and the gradient-index lens element 250. In addition, in the embodiment, the gradient-index lens element 250 is disposed between the see-through mirror/coating 210 and the polarizer 230, the see-through mirror/coating 210 is disposed on the surface 252 of the gradient-index lens element 250 away from the second aspheric lens element 240, and the quarter-wave plate 220 is disposed on the surface 254 of the gradient-index lens element 250 close to the second aspheric lens element 240.

Figure 6:
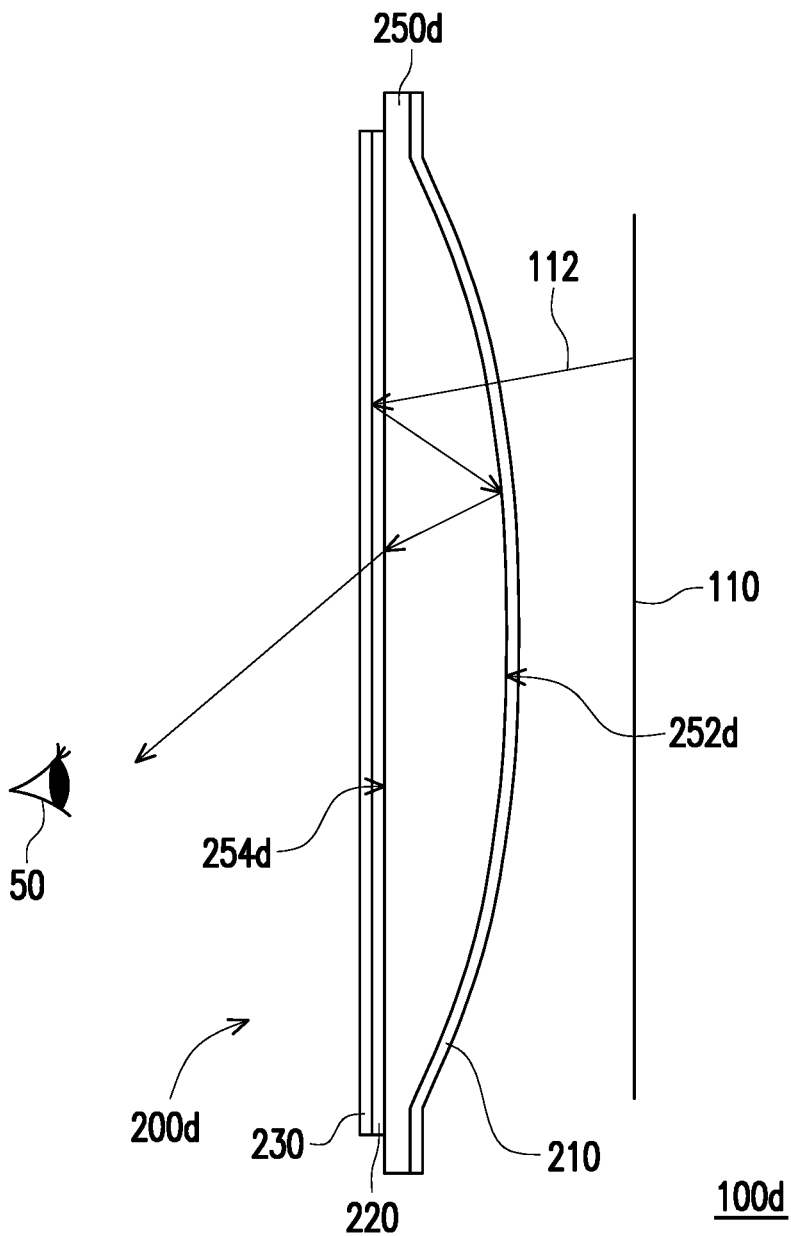
FIG. 6 is a schematic cross-sectional view illustrating a head-mounted display according to another embodiment of the disclosure.

FIG. 6 is a schematic cross-sectional view illustrating a head-mounted display according to another embodiment of the disclosure. Referring to FIG. 6, a head-mounted display 100d of the embodiment is similar to the head-mounted display 100 of FIG. 1, and the difference therebetween is as set forth in the following. A lens 200d of the head-mounted display 100d of the embodiment further includes an aspheric lens element 250d disposed between the see-through mirror/coating 210 and the polarizer 230. The aspheric lens element 250d includes a planar surface (e.g., a surface 254d), and the quarter-wave plate 220 is disposed on the planar surface (e.g., the surface 254d) of the aspheric lens element 250d. In addition, the see-through mirror/coating 210 is located on a surface 252d of the aspheric lens element 250d close to the display panel 110, the quarter-wave plate 220 is located on a surface 254d of the aspheric lens element 250d away from the display panel 110, and the polarizer 230 is disposed on a side of the quarter-wave plate 220. In addition, the quarter-wave plate 220 is located between the polarizer 230 and the aspheric lens element 250d. In an embodiment, the polarizer 230 is disposed on the surface of the quarter-wave plate 220. In an embodiment, the surface 252d is a convex surface, for example, and the aspheric lens element 250d may have positive refractive power. In an embodiment, the aspheric lens element 250d may be an aspheric gradient-index lens element, such as any one of the gradient-index lens elements 60a, 60b, and 60c of FIGS. 2A, 2B, and 2C. In addition, a material of the aspheric lens element 250d may be a plastic material.

A wave plate is also referred to as a phase retarder, manufactured by processing a birefringent material, and adapted to adjust the polarization state of a beam. A conventional wave plate is manufactured by using a uniaxial crystal (e.g., quartz crystal), and the surface thereof is parallel to the optical axis. The polarization component (o light) perpendicular to the optical axis and the polarization component (e light) parallel to the optical axis do not undergo birefringence. However, due to different propagation speeds, the polarization components still propagate along the original directions after passing through the wave plate, and a phase shift occurs. The amount of phase shift depends on the thickness, material, and operating wavelength of the wave plate. Common wave plates include a half-wave plate and a quarter-wave plate.

When the angle included between the incident vibration plane of the polarized light and the optical axis of the wave plate is 45°, the light passing through the quarter-wave plate is circularly polarized light. Comparatively, after passing through the quarter-wave plate, the circularly polarized light becomes linearly polarized light. The effect when light passes through the quarter-wave plate twice is equivalent to the effect of a half-wave plate.

In view of the foregoing, in the lens of the head-mounted display according to the embodiments of the disclosure, a gradient-index lens element or an aspheric gradient-index element having a planar surface is adopted, and the quarter-wave plate is disposed on the planar surface of the gradient-index lens element or the aspheric gradient-index lens element. Since the quarter-wave plate is disposed on the planar surface, instead of being disposed on a curved surface, the yield for attaching the quarter-wave plate is facilitated. Consequently, the yield as well as the optical imaging quality of the lens of the head-mounted display according to the embodiments of the disclosure can be facilitated effectively.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-mounted display, comprising:
   a display panel, a see-through mirror/coating, a gradient-index lens element, and a polarizer disposed in sequence, wherein light leaving the display panel is circularly polarized light;
   a first aspheric lens element, disposed between the see-through mirror/coating and the polarizer, wherein the gradient-index lens element has a planar surface; and
   a quarter-wave plate, disposed on the planar surface of the gradient-index lens element.

2. The head-mounted display as claimed in claim 1, wherein the lens substantially comprises three lens elements.

3. The head-mounted display as claimed in claim 1, wherein the lens sequentially comprises a second aspheric lens element, the gradient-index lens element, and the first aspheric lens element, or the second aspheric lens element, the first aspheric lens element, and the gradient-index lens element along a direction.

4. The head-mounted display as claimed in claim 3, wherein the see-through mirror/coating is located on a lens element surface furthest away from the second aspheric lens element.

5. The head-mounted display as claimed in claim 3, wherein the polarizer is located on a surface of the second aspheric lens element close to the gradient-index lens element.

6. The head-mounted display as claimed in claim 3, wherein the quarter-wave plate is located on a surface of the gradient-index lens element close to the first aspheric lens element.

7. The head-mounted display as claimed in claim 1, wherein materials of lens elements in the lens are all plastic materials.

8. The head-mounted display as claimed in claim 1, wherein the see-through mirror/coating is capable of allowing 50% of an image beam to pass through and capable of reflecting 50% of the image beam, and the image beam is emitted by a display panel of the head-mounted display.

9. The head-mounted display as claimed in claim 1, wherein the polarizer is a reflective polarizing film or a reflective polarizing sheet.

10. The head-mounted display as claimed in claim 1, satisfying a condition selected from the group consisting of:
the polarizer being a linear polarizer; and
the first aspheric lens element being a biconvex lens element or a plano-convex lens element.

11. The head-mounted display as claimed in claim 1, wherein the display panel is a liquid crystal display panel with a quarter-wave plate disposed on a light emitting surface of the display panel.

12. The head-mounted display as claimed in claim 1, wherein the display panel is an organic light emitting diode display panel with a circular polarizer or a quarter-wave plate disposed on a light emitting surface or a light exiting surface of the display panel.

13. A lens of a head-mounted display, comprising:
a see-through optical layer, a quarter-wave plate, and a polarizer disposed in sequence,
wherein the lens further comprises a gradient-index lens element and an aspheric lens element disposed between the see-through optical layer and the polarizer, the gradient-index lens element comprises a planar surface, the quarter-wave plate is disposed on the planar surface of the gradient-index lens element, an end of the lens on a display side, the lens element closest to the outer surface, is essentially a lens element with the see-through optical layer on a surface of the lens element, and the see-through optical layer faces outward.

14. The lens of the head-mounted display as claimed in claim 13, wherein materials of lens elements in the lens are all plastic materials.

15. The lens of the head-mounted display as claimed in claim 13, wherein the see-through optical layer is capable of allowing 50% of an image beam to pass through and capable of reflecting 50% of the image beam, and the image beam is emitted by a display panel of the head-mounted display.

16. The lens of the head-mounted display as claimed in claim 13, wherein the polarizer is a reflective polarizing film or a reflective polarizing sheet.

17. The lens of the head-mounted display as claimed in claim 13, wherein the polarizer is a linear polarizer.

18. A lens of a head-mounted display, sequentially comprising:
a see-through mirror/coating, a quarter-wave plate, and a polarizer,
wherein the lens further comprises an aspheric gradient-index lens element disposed between the see-through mirror/coating and the polarizer, the aspheric gradient-index lens element comprises a planar surface, and the quarter-wave plate is disposed on the planar surface of the aspheric gradient-index lens element.

19. The lens of the head-mounted display as claimed in claim 18, wherein the polarizer is located on a surface of the quarter-wave plate.

20. The lens of the head-mounted display as claimed in claim 18, wherein the polarizer is a reflective polarizing film or a reflective polarizing sheet.

* * * * *